(No Model.)  3 Sheets—Sheet 1.
M. RUL.
POLYHEDRAL LATHE.
No. 495,839.  Patented Apr. 18, 1893.
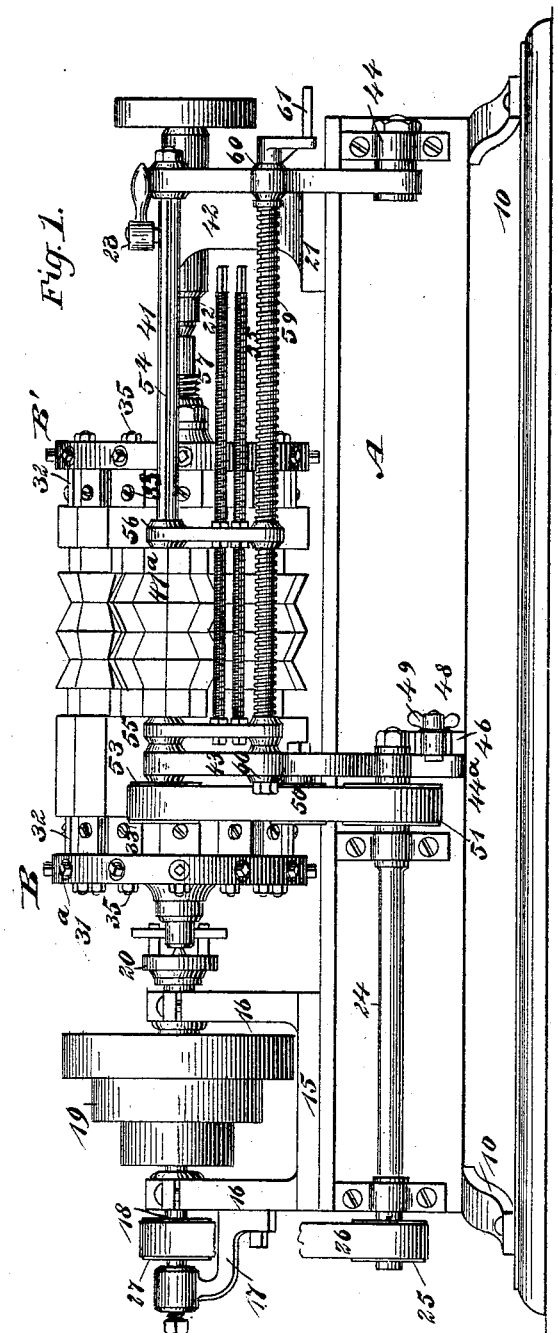
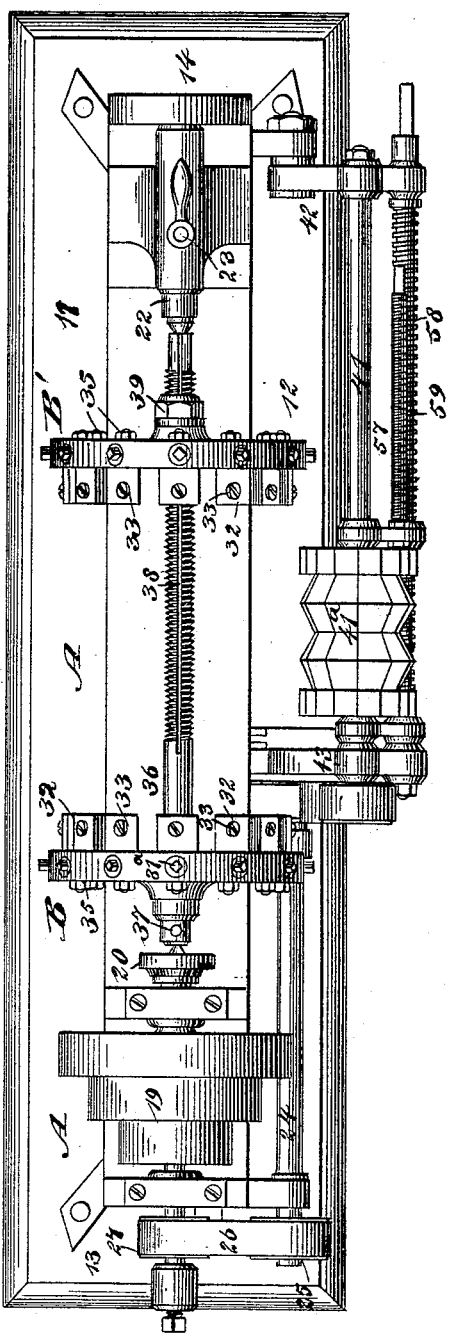
WITNESSES:
J. A. E. Criswell
C. Sedgwick
INVENTOR
M. Rul
BY Munn & Co.
ATTORNEYS.

(No Model.) 3 Sheets—Sheet 2.
M. RUL.
POLYHEDRAL LATHE.
No. 495,839. Patented Apr. 18, 1893.
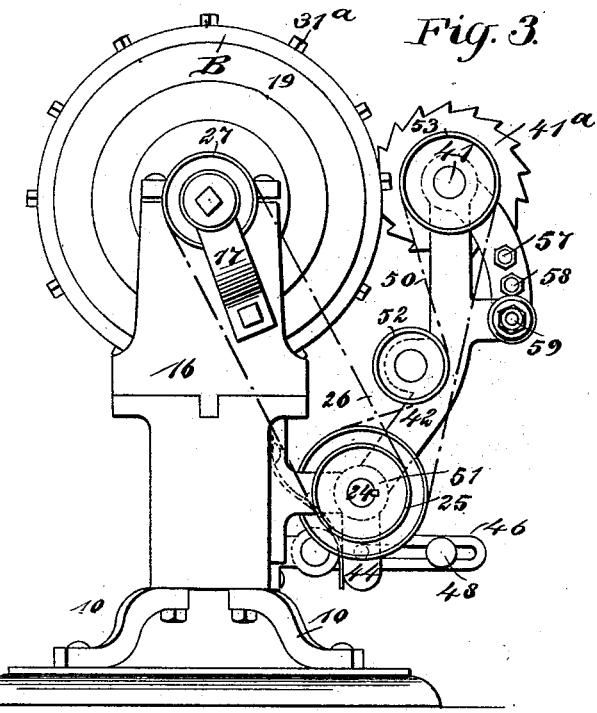
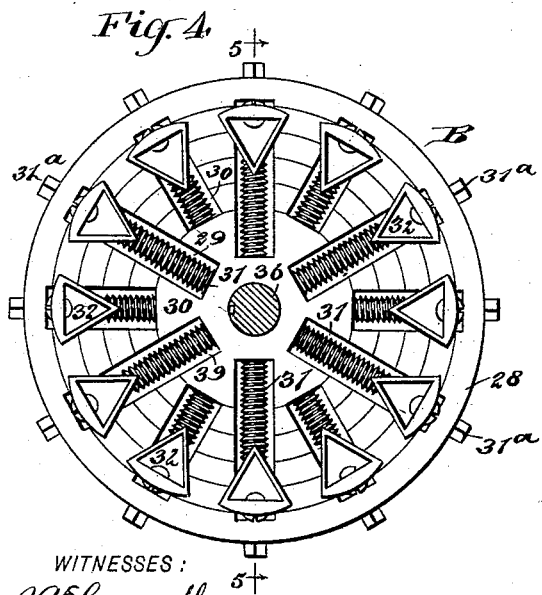
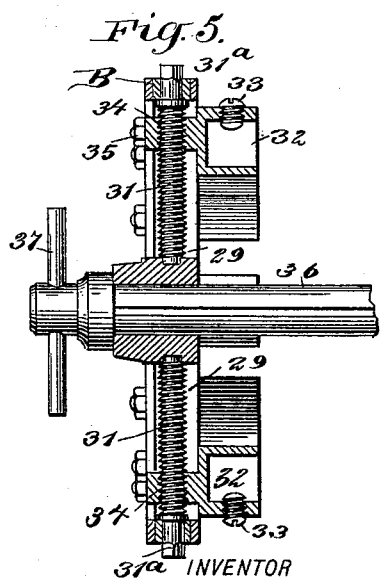
WITNESSES:
J. A. E. Criswell
C. Sedgwick
INVENTOR
M. Rul
BY Munn & Co.
ATTORNEYS.

(No Model.) 3 Sheets—Sheet 3.
M. RUL.
POLYHEDRAL LATHE.
No. 495,839. Patented Apr. 18, 1893.
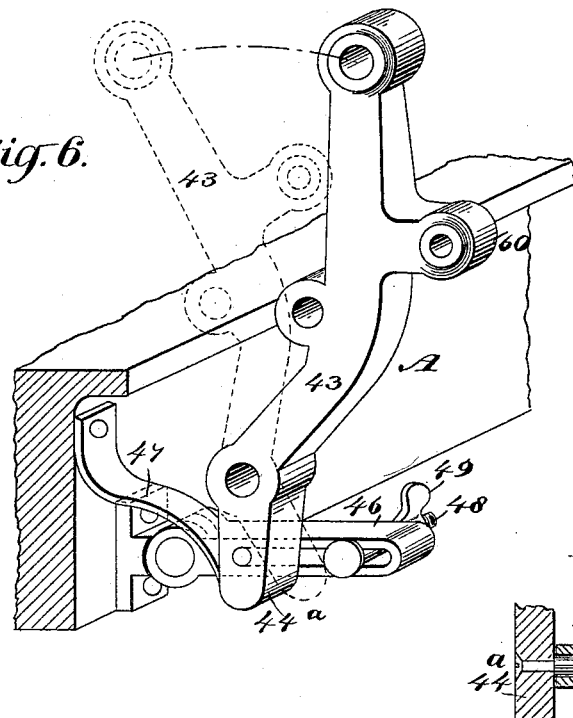
Fig. 6.
Fig. 7.
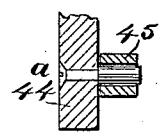
Fig. 9. Fig. 8.
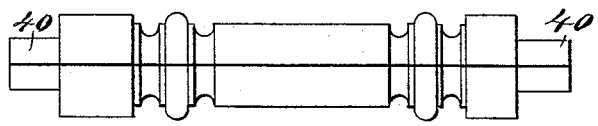
Fig. 11. Fig. 10.
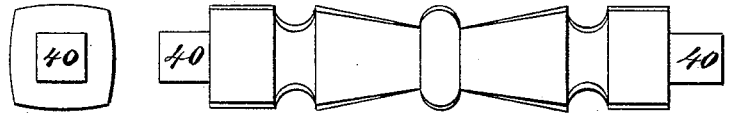
Fig. 12.
WITNESSES:
J. A. E. Criswell.
C. Sedgwick.
INVENTOR
M. Rul
BY Munn & Co.
ATTORNEYS.

UNITED STATES PATENT OFFICE.

MANUEL RUL, OF MEXICO, MEXICO.

POLYHEDRAL LATHE.

SPECIFICATION forming part of Letters Patent No. 495,839, dated April 18, 1893.

Application filed July 9, 1892. Serial No. 439,459. (No model.)

*To all whom it may concern:*

Be it known that I, MANUEL RUL, of the city of Mexico, Mexico, have invented a new and useful Improvement in Polyhedral Lathes, of which the following is a full, clear, and exact description.

My invention relates to an improvement in lathes, especially to that class of lathes known as polyhedral lathes, and has for its object to provide a lathe of exceedingly simple, durable and economic construction upon which articles ordinarily turned upon lathes may be conveniently manipulated and the results obtained be equal to those obtained from an ordinary lathe and whereby work may be performed in a more expeditious manner, and further whereby prisms of any character may be turned, and whereby also a number of articles may be placed in the lathe and presented consecutively to the turning or cutting tool or tools.

The invention consists in the novel construction and combinations of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the lathe. Fig. 2 is a plan view thereof. Fig. 3 is an end view. Fig. 4 is a face view of one of the chucks. Fig. 5 is a vertical section taken practically on the line 5—5 of Fig. 4. Fig. 6 is a perspective view of the controlling mechanism of the tool spindle. Fig. 7 is a section taken through the base of one of the supporting arms of the tool spindle, illustrating the connection therewith of a friction roller. Fig. 8 is a plan view of one of the articles produced by the lathe. Fig. 9 is an end view of the article shown in Fig. 8. Fig. 10 is a plan view of an article also produced upon the lathe, differing in external contour from that shown in Fig. 8. Fig. 11 is an end view of the product of the machine shown in Fig. 10; and Fig. 12 is an end view of a purely polygonal figure capable of being produced upon the machine.

In carrying out the invention the base A of the machine is supported preferably upon suitable legs 10, located ordinarily at the corners thereof, and this base consists of side pieces 11 and 12 and end pieces 13 and 14. The end piece 13 may be denominated the front end of the machine, and upon it a frame is attached, comprising a base 15 and uprights 16, spaced some distance from each other. This frame is ordinarily secured to the base, but may be adjustable thereon if in practice it is found desirable. At the outer end of the frame a bracket 17, is attached; and in the bracket and in the frame the main drive shaft of the machine is journaled. Between the uprights 16, upon the drive shaft 18, a step or conical pulley 19, is securely fastened, this pulley being the speeding pulley; and upon the inner end of the shaft 18 a live center 20, of any approved description, is located and secured. At the opposite end of the base a standard 21, is placed, in which a dead center 22, is located, the center being adapted to be laterally adjusted in the standard and secured in any suitable position by means of a set screw 23, or the equivalent thereof.

At one side of the machine at the end in which the live center is located, a drive shaft 24, is journaled; and this drive shaft carries a pulley 25 at its outer end, which is connected by a belt 26 with a pulley 27 located upon the drive shaft 18.

In connection with the parts of the lathe above described, two chucks B and B', are employed. These chucks are identical in construction, and are shown in detail in Figs. 4 and 5, and the chucks are of circular construction or of disk-like form. Each chuck comprises a face plate 28, preferably of disk-like form, as stated, and these face plates are provided with a series of radial slots 29 and 30, extending from a point near the centers of the plates to a point near their peripheries. It is desirable that as many slots should be produced in the face plate as possible so as to render the chucks of a multiple character. Twelve slots are ordinarily produced in each of the face plates, but the number of slots may be varied as occasion may demand or the character of the work may require. When twelve slots are utilized, as shown in the drawings, especially in Fig. 4, six of them are longer than the remaining six, the longer slots having been designated as 29 and the shorter by the numeral 30, and these slots are alternately arranged.

Through the periphery of each face plate a number of adjusting screws 31, is passed, corresponding to the number of slots. These adjusting screws pass through the slots longitudinally and turn in the base wall thereof and in the outer or upper walls of the slots; and each screw extends beyond the peripheral surface of the face plates in which they are located, their outer projecting ends being preferably made polygonal, as shown at 31ᵃ in the drawings, in order that the screws may be turned by means of a wrench, or a like tool. Each adjusting screw, as shown in Fig. 5, carries a socket 32, and these sockets correspond to the ordinary jaws of a chuck. The sockets shown in Figs. 4 and 5, are of somewhat triangular shape, and are therefore adapted to receive a triangular tenon produced upon the articles to be manipulated, but the contour of the sockets is made to correspond to the contour of the tenon produced upon the article to be turned; therefore, the sockets may be of any polygonal shape, or they may be rectangular, oval, or circular.

Each socket is provided with a set screw 33, to clamp the tenon inserted into it; and each socket is further provided with an integral horizontal stem 34, located at its back, the said stem being provided with an aperture the walls of which are threaded to receive the adjusting screw 31; and the shank of each socket is likewise provided with a clamping screw and nut 35, whereby after the socket has been brought to a proper position by the manipulation of its set screw, the shank by the tightening up of the clamping nut upon its screw will prevent the socket from being moved even though the clamping screw be tampered with; and it is evident that the further the sockets are carried inward toward the centers of the chucks the less will be the radius of the face of the article to be turned; while when the sockets are carried upward or outward to their utmost limit, approximately square surfaces may be turned upon the articles clamped therein, and in fact a surface may be produced similar to that shown in Fig. 11 or in Fig. 12.

The chucks B and B', are connected by a screw shaft 36, and the screw shaft is held to turn loosely in the chuck B. The outer end of the shaft, which receives the live center 20, is preferably provided with a diametrically projecting pin 37, whereby the chuck B, and likewise the screw shaft, may be readily revolved. The shaft 36, is threaded at its outer end, and the thread extends some distance in direction of the chuck B, which is loosely mounted upon the shaft; and the shaft 36, is likewise provided with a longitudinal groove or channel 38, extending entirely through its threaded surface. The chuck B', is adapted to slide somewhat loosely over the threaded surface of the shaft, and said chuck is provided with a key or feather, which enters and is adapted to slide in the channel 38 of the shaft. Upon the threaded end of the shaft, outside of the chuck B', one or more lock nuts 39, are located. It will be observed by reference to Fig. 5, that the chuck B, turns upon the plain surface of the shaft 36, yet the chuck B is without sliding movement upon the shaft. Thus, in operation, when the tenons 40 of the articles to be turned, wood or metal, are placed in the sockets 32 of the chuck B, for example, the opposite chuck B', is slid along the shaft 36 until the tenons at the opposite ends of the articles to be turned enter the sockets of that chuck, and when a secure binding engagement has been effected between the sockets of the two chucks and the pieces to be turned the lock nut 39 is screwed up, by holding it with a wrench, for instance, and turning the shaft 36 by means of the pin 37; or the lock nut may be carried to position in any other suitable or approved manner. If in practice it is found desirable the shaft 36 may be rigidly secured to the chuck B. It will be understood that each piece to be turned is provided with a tenon at its ends, which tenons have been referred to and are designated as 40, and they are shown in Figs. 8, 9, 10, 11 and 12. These tenons may be of any desired cross sectional shape, and the sockets 32 of the chucks have the same interior shape as the tenons they are adapted to receive.

The shaft 41, which is adapted to receive the cutters 41ᵃ to produce the desired shape upon the articles held between the chucks, is mounted in the upper ends of two arms 42 and 43. The lower ends of these arms are somewhat downwardly and inwardly curved, and the arms are shown in Figs. 1 and 3, the principal arm being shown in detail in Fig. 6. The shaft 41, turns loosely in the upper ends of the arms, which are boxed to receive the shaft, and these arms support the shaft near its ends. The lower end of the arm 42, is pivotally attached to an offset 44, located upon one side of the machine near its rear end, as shown in Fig. 1. The opposite arm 43, which is actually the guide arm, is near its lower end loosely pivoted upon one extremity of the shaft 24, the latter shaft, as has heretofore been stated, being journaled at the front end of the machine, as shown in Fig. 1. The arm 43, below its pivot point is provided with a downwardly-extending foot section 44ᵃ, and this foot section carries upon its rear face a friction roller 45, the friction roller being made to travel within a link 46, which link at its inner end is pivotally attached to, or has a hinged connection with the side of the frame A of the machine, as shown in Fig. 6. As both of the arms 42 and 43 are connected through the medium of the cutter shaft 41, any guided movement imparted to the arm 43, will be transmitted to the arm 42; and guided movement is obtained through the medium of a spring 47, or the equivalent thereof, secured to one side of the machine base, as shown in Fig. 6, the spring having a bearing at its outer end against the lower inner portion of the foot section 44ª of the guide arm 43, and the tendency of the spring is such that the cutters upon the shaft 41, are normally pressed in engagement with the articles carried by the chuck and to be operated upon and shaped. The arms 42 and 43, together with the cutter shaft may have a slight outward movement; and the outward throw of the shaft and arms is regulated at pleasure through the medium of an adjusting bolt 48, located in the link 46, the head of the bolt engaging with one side edge of the link, and the opposite end of the bolt being provided with a lock-nut 49, whereby the bolt may be securely connected with the link at any point in the length of the latter; and according to the position of the bolt 48 in the link 46, the outward throw of the cutter shaft and the arms will be greater or less, as the moment that the friction roller 45, traveling in the link 46 and attached to the foot of the arm 43, engages with the bolt 48, the outward movement of the cutter shaft and the arms will be stopped.

The cutter shaft 41, is driven by means of a belt 50, which passes over a pulley 51, secured upon the line shaft 24, and this belt likewise engages with an idler or tension pulley 52, carried by the guide arm 43, and from this idler or tension pulley the belt passes upward over a pulley 53, located preferably upon the outer end of the cutter shaft 41, as shown in Fig. 2.

The cutters 41ª, are adapted to have sliding movement upon the shaft 41, yet are intended to turn with that shaft; therefore the cutters are loosely mounted upon the shaft, and are provided with feathers or splines, adapted to enter and travel in longitudinal grooves 54, produced in the cutter shaft. The cutters 41ª, are also held or clamped between two clamping arms 55 and 56, these arms being located one at each end of the mass or gang of cutters; the adjustment of the cutters upon the cutter shaft is effected through the movement of these clamping arms 55 and 56, and as the movement of the cutters should be more or less varied, the clamping arms should be capable of independent and also of concerted movement; therefore, an adjusting screw 57, is passed through the threaded aperture in the arm 56, for instance, and is held to loosely turn in the arm 55; therefore, by the revolution of the adjusting screw shaft 57 the arm 56, may be carried in direction of the free end of the cutter shaft 41, as both the arms 55 and 56, have free movement upon the cutter shaft.

Below the adjusting screw shaft 57 a second and similar shaft 58, is located; it has free movement in the arm 56, but engages with the threaded walls of an aperture in the arm 55. Thus by the manipulation of the shaft 58 the forward arm 55, may be carried in direction of either end of the cutter shaft; and it is evident that through the medium of the two adjusting screw shafts 57 and 58, each of the clamping arms may be independently adjusted. When both arms are to be carried in one direction, whether in direction of the forward or of the rear end of the cutter shaft, it is effected through the medium of the main adjusting screw shaft 59, which passes through bearings 60, in the supporting arms of the cutter shaft, and through the lower ends of the clamping arms 55 and 56, the main adjusting shaft being usually manipulated through the medium of an attached crank arm 61.

In Figs. 8, 10 and 12, and in Figs. 9 and 11, a few of the shapes which it is possible to turn upon the machine are illustrated. In operation, when the material to be turned has been clamped in the manner heretofore set forth between the chucks, the cutters 41ª, are placed upon the cutter shaft, and are adjusted thereon in such a manner as to bring them to a proper bearing upon the articles; and the supporting arms of the shaft, having an inward tendency created by the spring 47, the cutters are normally held in engagement with the outer faces of the articles carried by the chucks. Thus at one revolution of the chucks it is possible to turn one face of all the articles carried by the chucks and when one face of all these articles has been turned the machine is stopped, the articles are reversed to offer another face upward, the machine is again started and the new faces are presented to be shaped. This operation is repeated until all the predetermined faces of the articles have acquired the chosen shape. By this means articles may be rapidly, accurately and conveniently shaped, and the faces may be turned more or less flat, and with a greater or less degree of radii by means of the adjusting screws 31 of the chucks and the setting of the adjusting bolt 48 controlling the outward movement of the supporting arms of the cutter shafts.

Having thus described my invention, I claim as new and desire to secure by Letters Patent—

1. The combination with the lathe frame, of arms pivoted thereon to swing toward and from the work, one of said arms being provided with an extension below its pivot a tool shaft mounted in the upper ends of said arms, a spring pressing the upper ends of the arms inwardly, a vertically swinging transversely slotted link 46 pivoted to the frame and extending past said extension, a laterally extending projection on said extension sliding within the link slot, and an adjustable limiting device in said slot in front of said arm extension, substantially as set forth.

2. The combination with a lathe, of the longitudinal extending tool shaft, pivoted arms and having bearings in which said shaft is journaled, tool clamps or guides slidable along the tool shaft and adjusting mechanism carried by said arms for separately adjusting either of the said clamps or guides or simultaneously adjusting both clamps or guides, substantially as set forth.

3. In a lathe, the combination, with opposing chucks provided with adjusting screws, sockets carried by the adjusting screws, retaining devices carried by the sockets, and a connecting shaft uniting the chucks, of a cutter shaft, arms supporting the cutter shaft, which arms are adjustable to and from the chucks, a tension device bearing against the lower portion of one of the arms, a limiting device located in front of one of the arms, cutters arranged to slide upon the cutter shaft, and an adjusting mechanism connected with the cutters, as and for the purpose set forth.

4. In a lathe, the combination, with opposing chuck, a screw uniting the same, the chucks being provided with radially-disposed slots, adjusting screws located in the slots of the chucks, sockets carried by the adjusting screws and retaining devices carried by the sockets, of a cutter shaft, arms supporting the cutter shaft and fulcrumed upon a fixed support, said arms being adapted to move to and from the chucks, a tension device bearing against one of the arms, a retaining device located in front of the arm operated upon by the tension device, cutters adjustably located upon the cutter shaft, guide arms having movement upon the cutter shaft and arranged one at each side of the cutters, adjusting screw shafts passing through the cutter arms, each shaft acting upon one arm only, and a common or main screw adjusting shaft acting upon both of the arms, substantially as and for the purpose set forth.

5. The combination in a lathe with the cutter shaft and arms supporting the shaft movable toward and from the lathe of a spring bearing against the lower portion of one of the arms, a limiting device located in front of one of the arms, cutter guiding and clamping devices arranged to slide upon the cutter shaft and an adjusting mechanism connected with said clamping devices, substantially as set forth.

6. The combination with the cutter shaft and its swinging supporting arms, of a tension device bearing against one of the arms, a retaining device located in front of one of said arms, cutter clamping and guiding arms movable along the tool shaft adjusting screw shafts passed through said clamping arms and each acting upon one arm only, and a common or main screw shaft for acting upon both of the arms, substantially as set forth.

MANUEL RUL.

Witnesses:
YLDEFONSE PALMA SUARER,
F. E. TRAINER.